United States Patent [19]

Buschfeld et al.

[11] 3,968,308
[45] July 6, 1976

[54] PROCESS FOR THE MANUFACTURE OF CHIP BOARDS USING CONDENSATION RESINS AS BINDERS AND PRODUCT

[75] Inventors: Adolf Buschfeld, Alpen; Manfred Gramse, Rheinkamp-Repelen; Dragomir Simic, Mulheim (Ruhr), all of Germany

[73] Assignee: Deutsche Texaco Aktiengesellschaft, Hamburg, Germany

[22] Filed: Dec. 16, 1974

[21] Appl. No.: 533,386

[30] Foreign Application Priority Data
Dec. 22, 1973 Germany............................ 2364251

[52] U.S. Cl................................ 428/402; 156/62.2; 156/284; 156/307; 264/113; 264/122; 264/126; 428/525
[51] Int. Cl.² ........................ B29J 5/00; D21J 1/18
[58] Field of Search ........... 264/109, 112, 113, 121, 264/117, 122, 123, 126; 156/62.2, 284, 307; 428/402, 525

[56] References Cited
UNITED STATES PATENTS

| | | | |
|---|---|---|---|
| 2,711,381 | 6/1955 | Novotny et al. | 264/122 |
| 3,061,878 | 11/1961 | Chapman | 264/112 |
| 3,391,233 | 7/1968 | Polovtseff | 264/113 |
| 3,435,106 | 3/1969 | Hager | 264/113 |

*Primary Examiner*—Willard E. Hoag
*Attorney, Agent, or Firm*—T. H. Whaley; C. G. Ries

[57] ABSTRACT

The present invention relates to a process for the manufacture of chip boards especially multi-layer chip boards, using condensation resins as binders, and the products thereof the improvement including wetting powdered adhesive particles before applying the adhesive particles to wood chips.

7 Claims, No Drawings

PROCESS FOR THE MANUFACTURE OF CHIP BOARDS USING CONDENSATION RESINS AS BINDERS AND PRODUCT

The present invention relates to a process for the manufacture of chip boards especially multi-layer chip boards, using condensation resins as binders, and the products thereof.

It is known to manufacture chip boards with aqueous solutions of binders. These binders are generally phenol-, urea-, ketone-formaldehyde and melamine resin condensation products, as well as co-condensates thereof. However, the aqueous solutions of these binders used in the manufacture of chip boards mostly contained so much water that considerable amounts of heat were required for the water evaporation alone, while manufacturing the said chip boards, which resulted in unacceptable delays in moulding times with a concomitant reduction in the capacity of the press over a given time period.

Customarily, in chip board manufacture, high alkaline-condensed aqueous phenol formaldehyde resin solutions having solids contents of from about 40 to 50% be weight, were employed in the manufacture of, for instance, phenolic resin-bonded chip boards. This solids concentration range was relatively low; nevertheless this range was essential when employing the high alkaline condensation resins that needed only short hardening times. However, such a concentration range proved to be disadvantageous, especially in manufacturing multi-layer chip boards, as primarily the water content of the centre section of the produced chip boards were unfavourably high.

Prior to the present invention it was the general practice to keep the water content of the "glued" (impregnated with the binder solution) centre section chips as low as possible, for too much steam generation in the centre section led to a delay in curing of the binder and therewith an unacceptable prolongation of moulding time of the chip boards. Moreover, in known chip board manufacturing procedures, the excessively high water content of said centre section worked against the manufacturer's need to press glued cover layer chips having the highest possible moisture content. The high moisture content of the glued layer chips is needed to improve the surface properties of said boards and to yield, on account of a quicker heat transmission from the outside of the board to the inside, a reduction of moulding time.

Prior attempts to substantially increase the solids content of, for example, phenolic binder solutions without changing the ratio of resin to chips were unsuccessful because the extremely high viscosity of the resulting binder solutions no longer allowed them to be sprayed onto the chips. Thus, a reduction in hardening time could not be achieved.

Attempts to overcome the disadvantages of the method by adding the binder in the form of powder to the chips instead in the form of solution even with chips having a moisture content of as much as 15 percent by weight, and more, were unsuccessful. One could not fix the powder binder to the chip in such a manner that it stuck evenly on the surface area of the chips. On the contrary, there resulted a sedimentation of the powder binder which become visibly apparent when the chips were spread onto the unworked chip board pieces. This resulted in an unacceptable loss in binder content in the cover layer and also to an increase in the binder content in the bottom layer. The net result was a manufactured chip board with poor stability.

Another attempt to over come these known disadvantages was to moisten, shortly before the powder binder was added, chips having a residual moisture content of from 2 to 3% by weight, superficially until they had a residual moisture content of 10% by weight, and more, by spraying water thereonto. This attempt was unsuccessful on account of the sedimentation occurring during such a procedure.

Another attempt to solve the manufacturing problem of having centre section chips with a residual moisture content of 10% by weight, and less, was by spraying (resin) powder onto chips having a moisture content of 25% by weight, and more, and subsequently drying them to a residual moisture content of 10% by weight. This procedure was not successful for two reasons, first, the adhesion of the powder to the chips was insufficient and, second, a partial hardening of the resin binders took place during the drying stage.

Finally, related German Pat. No. 883,337 discloses a process for the manufacture of single layer chip boards, according to which process the wood chips are moistened while being mixed with the pulverulent resin binding agent by spraying with water, or steam. This single layer chip board process requires the chips to have a moisture content of at least 10% by weight as, otherwise, a dissociation (unwanted aglomeriztion of resin separate from the chips) takes place while spreading the chips onto the unworked chip board piece. This moisture content requirement of at least 10%, however, is too high for centre sections to be compatible with the desired short moulding times sought after today in modern manufacturing of multi-layer boards. Further, even in manufacturing single-layer boards according to the aforesaid patented process, the desired firmness is not obtained in the finished product.

It is an object of the present invention to provide an improved process by which powder binders can be sprayed onto wood chips so that the binders stick to the chips even when spreading the coated chips onto the unworked chip board piece, with the result that an even glueing and also a quick and good hardening is attained. The term "glueing", used herein, has the meaning of "binding".

The novel process of the invention is carried out in such a manner that the "glued" clips may have a moisture content of below 10% by weight without a dissociation taking place while spreading the chips. By means of the process of the invention, multi-layer chip boards fabricated from center section chips having a low moisture content and cover layer chips having a high moisture content are able to be manufactured in relatively short, acceptable moulding times.

It has now been discovered that pulverulent phenol-, urea-, ketone-formaldehyde and melamine resin condensation products and co-condensates thereof as the binders adhere firmly to the chips when the powdered binders are sprayed onto said chips and when concurrently a mist of atomized water is directed into the spray of powdered binder prior to the binder striking the chips. The aforementioned procedure causes the binder to adhere firmly to the chips so that no sedimentation of the pulverulent binders from the chips occurs during spreading of the said chips, thus attaining an even "glueing" of the chips.

Accordingly, the present invention comprises a process for the production of chip boards from wood chips using as the binding agent a condensation resin selected from the group consisting of phenol condensation products, urea condensation products, melamine condensation products, ketonic formaldehyde condensation products, and co-condensation products of said resins, wherein the said chips are wetted with water and then formed under heat and pressure into a chip board, the improvement comprising passing a spray of said binding agent in pulverulent form through a spray of atomized water before the spray of binding agent impinges onto said wood chips and the products therefrom.

Furthermore, in the process of the present invention, it is especially desirable to spray said mist of atomized water at an angle of incidence of from about 40° to about 50° into said mist of atomized powder binder.

In practice, the process of the present invention is carried out such that, at an angle of from about 40° to about 50°, preferably 42° to 46°, a stream of atomized water is sprayed into said mist of atomized powder binder which is being directed onto the rotating wood chip mixture, the mist of powder binders being provided by means of a powder spray gun (as known from the electrostatic coating process). It has been found desirable to incorporate in the water stream paraffin emulsions, hardeners for binders, etc., necessary for hydrophobizing the chips.

Wood chips having either a low, or a high, moisture content are employed in the process of the invention, the moisture content thereof depending on the desired moisture content of the resulting glued chips.

By the process of the invention one is now able to attain, for centre section chips, chips of low moisture content (approx. 2 to 3% by weight, based on dry wood) and the pulverulent binding agent is sprayed with water in such an amount that the moisture content of the coated chips is below 10% by weight, preferably between 6 and 9% by weight. For cover layers, wood chips having a higher moisture content may be used; these wood chips are sprayed with water in such an amount that the desired higher moisture content of 20 to 30% by weight results.

By the process of the present invention, in moulding multi-layer boards after having spread the chips onto the unworked chip board piece, the fixed powder of the centre section chips takes up water from the stream coming down from the cover layers to the centre sections, prior to the powder's final curing, thus improving its flowability.

It is now possible by the process of the present invention, to adjust the centre section chip residual moisture, which by prior art procedures greatly exceeded 10% by weight, to an amount less than 10% by weight at a "glue" (or binder) concentration of 9% of solid resin based on dry wood, and to adjust the cover layer moisture content, amounting to about 16 to 18% by weight in the prior art processes, to any desirable amount, e.g. 30 percent by weight at a glue concentration of 11% by weight of solid resin, based on dry wood. These advantages lead, first of all, to an essential reduction of moulding time due to the quicker heat transmission from the outside of the boards to the inside (so-called steam impinging effect), and secondly, to highly condensed smooth surface areas of the wood chips, said areas providing increased stability.

A further important economical advantage of the process of the invention is the fact that the cover layer chips need not be dried to a residual moisture content of, e.g. 4 to 5% by weight before use, but may be most advantageously employed with a residual moisture content of, e.g. about 30% by weight.

Following is a description by way of example of a method if carrying out the process of the present invention.

The advantages of the process of the invention are illustrated in detail by Example 1 and 2 below and compared with prior art manufacturing procedures, as exemplified by Comparative Examples A and B.

EXAMPLE 1

In the manufacture of 16 mm thick 3-layer chip boards in a spraying drum, 4.12 kilograms of centre section chips (3% by weight moisture/dry wood) are sprayed by means of an electrostatic powder spray gun with 330 grams of phenolic resin powder (97% by weight solids content), into the spray cone of which 135 grams of atomized water is sprayed at an angle of about 45° by means of airless-spray guns. After subsequently spraying the mixture with 80 grams of a 50 percent paraffin emulsion for hydrophobizing said chips, a moisture content of 7.0% by weight based on dry chip + resin mixture, is attained. The glue portion is 8% by weight of solid resin based on dry wood.

For glueing the cover layers chips, at a solids content of 11% by weight dry wood, 5.12 kilograms of chips (28% by weight moisture), 455 grams of phenolic resin powder (97% by weight solids content), 170 grams of water, and 80 grams of a 50% paraffin emulsion are worked up in the same manner. The glued chip has a moisture content of 27% by weight. The phenolic resin powder employed was obtained by spray-drying an aqueous solution thereof.

The powder-sprayed chips are spread in a ratio of centre section chips to cover layer chips of 70 : 30 to form an unworked chip board piece in the size of 55 × 55 cm (total moisture content 13.0% by weight) and moulded for 3.5 minutes at 165°C and at a pressure of 20 kp/sq.cm for yielding 16 mm thick chip boards. The chip boards having a consistent smooth surface area, at a specific gravity of 0.65 gram/cbcm, have a flexural strength of 225 kp*/sq.cm (German Industrial Standards (DIN) No. 52 362) a tensile strength V 100 perpendicular to plate (DIN NO. 52 365) of 3.5 kp/sq.cm, and an increase in swelling after a 24-hour-storage in water (DIN No. 52 364) of 9%.

*1 kp = 1 technical atmosphere

These properties will also be attained when the hydrophobizing agent is already contained in the water necessary for coating said binder powder.

COMPARATIVE EXAMPLE A

For conducting the comparative test, 4.12 kilograms of coarse chips for the centre section of the chip boards are sprayed in customary manner with a glue solution (8% by weight solid resin and 1% by weight paraffin/dry wood) consisting of 727 grams of a 44% phenolic resin solution and 80 grams of a 50% paraffin emulsion. The resultant residual moisture of the glued chips is 12.3% by weight.

For manufacturing cover layers, 4.18 kilograms of flue chips (4.5% by weight moisture/dry wood) are sprayed with 1080 grams of the glue solution consisting of 1000 grams of a 44% phenolic resin solution (11% by weight solid resin/dry wood) and 80 grams of a 50% paraffin emulsion (1% by weight of paraffin/dry wood). The glued chip boards have a moisture content of 16.2% be weight. The 44% phenolic resin solutions here employed are obtained by dissolving the pulverulent resols of Example 1 in water.

The 3-layer unworked piece to be moulded, the total moisture content of which being 13.5% by weight, is composed of 30% cover layer chips and 70% centre section chips. The moulding time of 3.5 minutes of 165°C and under a pressure of 20 kp/sq.cm as in Example 1 does not suffice for hardening said binder. Only with moulding times as long as 4.8 minutes at 165°C, 16 mm thick chip boards with inconsistent (unsmooth) surface areas are attained, which at a specific gravity of 0.66 gram/cbcm exhibit the following properties:

| | |
|---|---|
| Flexural strength | 190 kp/sq.cm |
| Tensile strength V 100, perpendicular to plate | 2.8 kp/sq.cm |
| Swelling after 24-hour-storage in water | 10.2% |

EXAMPLE 2

Like in Example 1, for manufacturing 16 mm thick 3-layer chip boards in a spraying drum, 4.12 kilograms of centre section chips (3% by weight moisture/dry wood) are sprayed, by means of a powder spray gun, with 320 grams of a melamine resin powder, into the spray cone of which 160 grams of a 5% aqueous hardener solution is sprayed in finely divided form at an angle of 45°, thus obtaining a portion of glue of 8% by weight solid resin/dry wood. Subsequently, after having been sprayed with 80 grams of a 50% paraffin emulsion for hydrophobizing the chips, the moisture content is 7.1% by weight.

At a solid resin content of 11% by weight/dry wood, 5.12 kilograms of chips (28% by weight moisture content), 440 grams of melamine resin, 225 grams of a 5% aqueous hardener solution, and 80 grams of a 50% paraffin emulsion are worked up in the same manner for manufacturing cover layers.

The moisture ascertained of the glued cover layer chip mixture is 28% by weight.

The chips so sprayed are spread to form an unworked piece in the size of 55 × 55 cm with a ratio of centre section chips to cover layer chips of 70 : 30, and are moulded for 4.8 minutes at 165°C and at a pressure of 20 kp/sq.cm. The chip boards have a specific gravity of 0.68 gram/cbcm. The chip boards have a consistent smooth surface area, and their flexural strength is 200 kp/sq.cm, their tensile strength V 20 is 5.8 kp/sq.cm, and the swelling after a 2-hour-storage in water is 2.5%.

These properties do not change when the hydrophobizing agent is already contained in the hardener solution necessary for coating said binder powder.

COMPARATIVE EXAMPLE B

In comparison to Example 2, 4.12 kilograms of chips (3% by weight moisture/dry wood) intended to be used as the centre section of the chip boards, are sprayed in customary manner with 720 grams of a melamine resin glue solution produced from 320 grams of melamine resin powder, 272 grams of water, 48 grams of a 17% aqueous hardener solution, and 80 grams of a 50% paraffin emulsion.

The residual moisture ascertained of the glued cover layer chips is 10.1% by weight. The glue portion is like that in Example 3 — 8% by weight solid resin/dry wood.

For manufacturing cover layers, 4.18 kilograms of chips (4.5% by weight moisture/dry wood) are sprayed with 1,070 grams of a resin solution produced from 440 grams of melamine resin powder, 484 grams of water, 66 grams of a 17% aqueous hardener solution and 80 grams of a 50% paraffin emulsion. The glue portion so adjusted is 11% by weight solid resin/dry wood, the moisture of the glued chips is 16.1% by weight.

Also here as in Example 2, the 3-layer unworked piece to be moulded consists of 30% of cover layer chips and 70% of centre section chips. After moulding said unworked piece for 4.8 minutes at 165°C and at a pressure of 20 kp/sq.cm, 16 mm thick chip boards having an inconsistent (unsmooth) surface area are obtained which, at a specific gravity of 0.684 gram/cbcm exhibit the following properties:

| | |
|---|---|
| Flexural strength | 195 kp/sq.cm |
| Tensile strength V 20 | 4.4 kp/sq.cm |
| Swelling after a 2-hour-storage in water | 3.6% |

Inspections of the test data reported in Examples 1 and 2 above illustrating the invention and comparing same with the test data obtained in comparative Examples A and B, show that the boards produced by the inventive process have superior properties.

The chip boards manufactured according to the process of the invention distinguish themselves from the boards manufactured according to the wet glueing process of the prior art described above, by improved binding strength and tensile strength, (perpendicular to plate), because lesser amounts of binders are absorbed by the wood in the process of the invention.

Obviously, other modifications and variations of the invention as hereinbefore set forth may be made without departing from the spirit and scope thereof and therefore only such limitations should be imposed as are indicated in the appended claims.

We claim:

1. In a process for the production of chip boards from wood chips using as the binding agent a condensation resin selected from the group consisting of phenol condensation products, urea condensation products, melamine condensation products, ketonic formaldehyde condensation products, and co-condensation products of said resins, wherein the said chips are wetted with water and then formed under heat and pressure into a chip board, the improvement comprising passing a spray of said binding agent in pulverulent form through a spray of atomized water before the spray or binding agent impinges onto said wood chips, and wherein said spray of atomized water contacts said spray of said binding agent at an angle of incidence of from about 40° to about 50°, and wherein after the spraying step, the center section chips of said chip board have a water content of from about 6 to about 9% by weight.

2. In a process as claimed in claim 1 wherein the improvement further comprises having said angle of incidence at from about 44° to about 46°.

3. Process as claimed in claim 1, wherein the improvement further comprises after the spraying step, the cover layer chips have a water content of about 30% by weight.

4. Process as claimed in claim 1, wherein the improvement further comprises introducing into the water stream before atomization, at least one component selected from the group consisting of a resin curing agent, a hydrophobizing agent and mixtures thereof.

5. A chip board produced by the process of claim 1.

6. Process as claimed in claim 1, wherein in the manufacture of multi-layer chip boards, the improvement further comprises for the center section thereof spraying the binding agent with atomized water in an amount sufficient for the center section chips to have a moisture content of less than about 10% by weight, and for the cover layers of said multi-layer chip boards, spraying the binding agent with atomized water in an amount sufficient for the cover layer chips to have a moisture content of from 20 up to about 30% by weight.

7. A multi-layered chip board produced by the process of claim 6.

* * * * *

UNITED STATES PATENT AND TRADEMARK OFFICE
CERTIFICATE OF CORRECTION

PATENT NO. : 3,968,308

DATED : July 6, 1976

INVENTOR(S) : Adolf Buschfeld; Manfred Gramse & Dragomir Simic

It is certified that error appears in the above-identified patent and that said Letters Patent are hereby corrected as shown below:

Col. 1, line 25 delete "be" and insert -- by --.

Col. 6, line 2 delete "101" and insert -- 10.1 --.

Signed and Sealed this

Seventeenth Day of October 1978

[SEAL]

Attest:

RUTH C. MASON
Attesting Officer

DONALD W. BANNER
Commissioner of Patents and Trademarks